(12) United States Patent
Andersen et al.

(10) Patent No.: US 10,601,310 B2
(45) Date of Patent: Mar. 24, 2020

(54) RANDOM PULSE WIDTH MODULATION FOR POWER CONVERTERS

(71) Applicant: VESTAS WIND SYSTEMS A/S, Aarhus N (DK)

(72) Inventors: Søren Andersen, Tilst (DK); Duy Duc Doan, Tilst (DK); Gert Karmisholt Andersen, Hovedgård (DK); Thomas Drljevic-Nielsen, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/529,840

(22) PCT Filed: Nov. 11, 2015

(86) PCT No.: PCT/DK2015/050340
§ 371 (c)(1),
(2) Date: May 25, 2017

(87) PCT Pub. No.: WO2016/082834
PCT Pub. Date: Jun. 2, 2016

(65) Prior Publication Data
US 2017/0264188 A1    Sep. 14, 2017

(30) Foreign Application Priority Data
Nov. 25, 2014 (DK) .............. PA 2014 70736

(51) Int. Cl.
*H02M 1/44* (2007.01)
*F03D 9/25* (2016.01)
(Continued)

(52) U.S. Cl.
CPC .............. *H02M 1/44* (2013.01); *F03D 9/255* (2017.02); *H02M 1/08* (2013.01); *H02M 1/12* (2013.01);
(Continued)

(58) Field of Classification Search
CPC ........ H02M 1/44; H02M 5/4585; H02M 7/48; H02M 1/08; H02M 1/12; H02M 7/217; F03D 9/255
(Continued)

(56) References Cited

U.S. PATENT DOCUMENTS 5,367,540 A * 11/1994 Kakuishi ............... H03H 17/04
375/232
5,510,698 A  4/1996 Stankovic et al.
(Continued)

FOREIGN PATENT DOCUMENTS

EP    2482418 A1    8/2012

OTHER PUBLICATIONS

Received STIC search report from EIC 2800 searcher Mesfin Getaneh on Sep. 25, 2017.*
(Continued)

*Primary Examiner* — Nguyen Tran
*Assistant Examiner* — Htet Z Kyaw
(74) *Attorney, Agent, or Firm* — Patterson + Sheridan, LLP

(57) ABSTRACT

A power generation system, wind turbine, and method of pulse width modulation (PWM) for power converters are disclosed. The method generally includes generating a substantially random distribution of timing values, applying a filter to the random distribution to produce a modified random distribution, and delivering PWM timing signals based on the modified random distribution to the power converters.

20 Claims, 6 Drawing Sheets

(51) Int. Cl.
*H02M 1/08* (2006.01)
*H02M 1/12* (2006.01)
*H02M 5/458* (2006.01)
*H02M 7/217* (2006.01)
*H02M 7/48* (2007.01)

(52) U.S. Cl.
CPC ......... *H02M 5/4585* (2013.01); *H02M 7/217* (2013.01); *H02M 7/48* (2013.01); *Y02E 10/725* (2013.01); *Y02E 10/76* (2013.01)

(58) Field of Classification Search
USPC ............................. 363/16, 17, 157–171, 37
See application file for complete search history.

(56) References Cited

U.S. PATENT DOCUMENTS

| | | | | |
|---|---|---|---|---|
| 5,705,989 | A * | 1/1998 | Cota | G01R 19/15 324/127 |
| 6,144,172 | A | 11/2000 | Sun | |
| 6,600,669 | B2 | 7/2003 | Trzynadlowski et al. | |
| 6,972,534 | B1 * | 12/2005 | Schulz | H02P 21/22 318/400.02 |
| 7,421,301 | B2 * | 9/2008 | Schulz | H02M 7/53873 318/599 |
| 2003/0002299 | A1 * | 1/2003 | Trzynadlowski | H02M 7/5395 363/21.1 |
| 2003/0052904 | A1 * | 3/2003 | Gu | G09G 3/2014 345/691 |
| 2003/0151259 | A1 * | 8/2003 | Feddersen | F03D 7/0224 290/44 |
| 2004/0189264 | A1 * | 9/2004 | Matsuura | H02M 1/082 323/224 |
| 2006/0268975 | A1 | 11/2006 | Bors | |
| 2010/0133831 | A1 * | 6/2010 | Scholte-Wassink | F03D 7/0292 290/44 |
| 2010/0135267 | A1 * | 6/2010 | Strutt | H04W 48/12 370/338 |
| 2011/0223006 | A1 * | 9/2011 | Loh | F03D 7/0224 415/118 |
| 2012/0243264 | A1 * | 9/2012 | Nakagawa | H02M 3/156 363/16 |
| 2013/0187385 | A1 * | 7/2013 | Wakasa | H02P 9/04 290/44 |
| 2014/0071564 | A1 * | 3/2014 | Kim | H02H 1/0015 361/42 |
| 2014/0266488 | A1 | 9/2014 | Bors | |
| 2016/0065105 | A1 * | 3/2016 | Hardwicke, Jr. | H02P 9/007 290/44 |
| 2017/0075378 | A1 * | 3/2017 | Ogasawara | G06F 1/04 |
| 2018/0018555 | A1 * | 1/2018 | Wong | G06N 3/04 |

OTHER PUBLICATIONS

Pedersen, J. K. et al: "Reduction of acoustic noise emission in AC-machines by intelligent distributed random modulation", Jan. 1, 1993 (Jan. 1, 1993), pp. 369-375.

Trzynadlowski, A. M. et al: "Random pulse width modulation techniques for converter fed drive systems-a review", Industry Applications Society Annual Meeting, 1993, Conference Record of The 1993 IEEE Toronto, ONT., Canada Oct. 2-8, 1993, New York, NY, USA, IEEE, US, Oct. 2, 1993, pp. 1136-1143.

International Search Report for PCT/DK2015/050340, dated Jan. 29, 2017.

Danish Search Report for PA 2014 70736, dated Jun. 30, 2015.

* cited by examiner

RANDOM PULSE WIDTH MODULATION FOR POWER CONVERTERS

BACKGROUND

Field of the Invention

Embodiments presented in this disclosure generally relate to generating electrical power. More specifically, embodiments disclosed herein provide noise-shaped random pulse width modulation (PWM) for power converters.

Description of the Related Art

In variable speed generators, a frequency converter is used to convert power from the generator at a variable frequency to a predefined frequency corresponding to a load—e.g., a utility grid. In one example, the frequency converter converts the AC signal provided by the generator to a DC signal and then back to an AC signal with a frequency that matches the desired frequency of the load. To convert the DC signal to an AC signal with the desired frequency, the frequency converter may use pulse width modulation (PWM) based on a switching frequency.

Operating power converters with a constant switching frequency produces clusters of harmonic peaks in power output signals, which appear as spectral energy concentrated at several discrete frequencies. These harmonics generally produce "tonal" noise at various frequencies within the electromagnetic spectrum. Reducing or eliminating tonal noise may be beneficial, as some countries impose strict noise regulations that limit amounts of audible noise that may be generated by a generator. Additionally, tonal noise may result in electromagnetic interference (EMI) that degrades performance of the power converters. Random PWM (RPWM) has been developed to distribute concentrated spectral energy across a continuous noise spectrum, which attenuates the discrete harmonics and reduces the overall intensity of tonal noise.

SUMMARY

One embodiment disclosed herein is a power generation system comprising a generator configured to output a power signal having one or more phases, a power converter system coupled to the generator to receive the output power signal, the power converter system comprising at least one respective converter for each of the one or more phases, and a controller arrangement coupled to the respective converters. The controller arrangement is configured to filter a substantially random distribution of timing values to produce a modified random distribution, and to deliver pulse width modulation (PWM) timing signals based on the modified random distribution to the respective converters.

Another embodiment disclosed herein is a wind turbine comprising a generator configured to output a power signal having one or more phases, a power converter system coupled to the generator to receive the output power signal, the power converter system comprising at least one respective converter for each of the one or more phases; and a controller arrangement coupled to the respective converters. The controller arrangement is configured to filter a substantially random distribution of timing values to produce a modified random distribution, and to deliver pulse width modulation (PWM) timing signals based on the modified random distribution to the respective converters.

Another embodiment disclosed herein is a method of pulse width modulation for power converters. The method comprises generating a substantially random distribution of timing values, applying a filter to the random distribution to produce a modified random distribution, and delivering pulse width modulation (PWM) timing signals based on the modified random distribution to the power converters.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Embodiments disclosed herein generally include a power generation system, wind turbine, and method of PWM for power converters. The power generation system generally includes a generator configured to output a power signal having one or more phases, a power converter system coupled to the generator to receive the output power signal, the power converter system comprising at least one respective converter for each of the one or more phases, and a controller arrangement coupled to the respective converters. The controller arrangement is configured to filter a substantially random distribution of timing values to produce a modified random distribution, and to deliver pulse width modulation (PWM) timing signals based on the modified random distribution to the respective converters.

Conventional random PWM includes frequencies across a continuous spectrum. However, operating power converters at certain switching frequencies may cause negative effects on the operation of the wind turbine. For example, EMI introduced by certain frequency components of the random PWM may affect operation of the controller by causing undesired current or torque signals in the generator, which in turn affects the quality of the output power signal. By appropriately shaping the frequencies of random PWM switching, effects at certain susceptible frequencies may be mitigated or avoided. Generally, embodiments allow for intelligent operation of a wind turbine, in which the benefits generally provided by random PWM (e.g., lower audible noise and EMI at harmonic frequencies) may be balanced against an acceptable amount of low-frequency distortion in controller.

Figure 1:
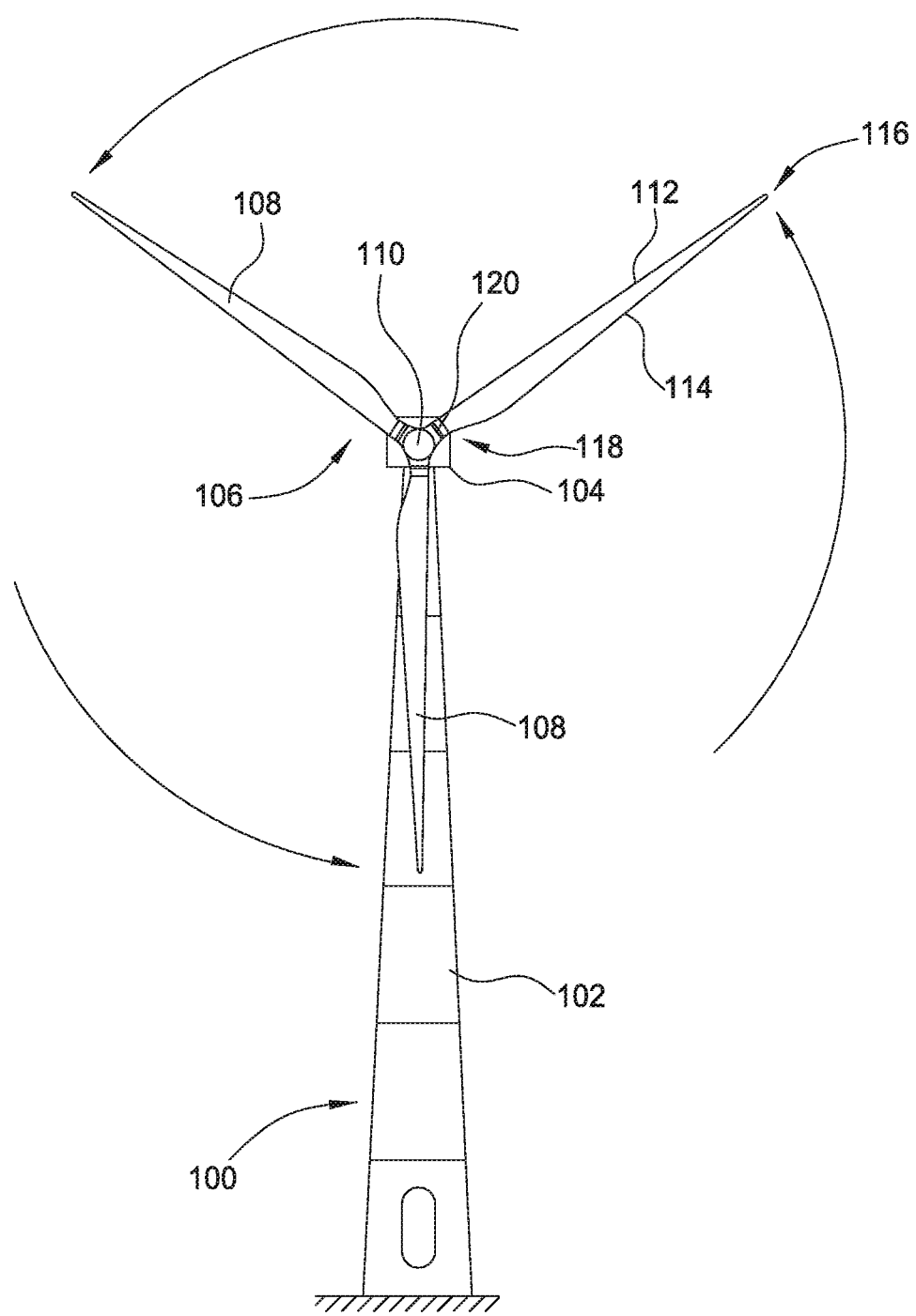
FIG. 1 illustrates a diagrammatic view of a wind turbine, according to one embodiment described herein.

FIG. 1 illustrates a diagrammatic view of a horizontal-axis wind turbine generator 100. The wind turbine generator 100 typically includes a tower 102 and a wind turbine nacelle 104 located at the top of the tower 102. A wind turbine rotor 106 may be connected with the nacelle 104 through a low speed shaft extending out of the nacelle 104. The wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade 108. Blade pitch control may also be used among others systems to maximize the power generated below rated wind speeds and to reduce the power generated above the rated wind speed to prevent excessive loading on turbine components, e.g., the generator and gearbox. Although the following embodiments are described in the context of a wind turbine, the embodiments are not limited to such. Indeed, this disclosure may apply to any power generation system using PWM for power converters.

Figure 2:
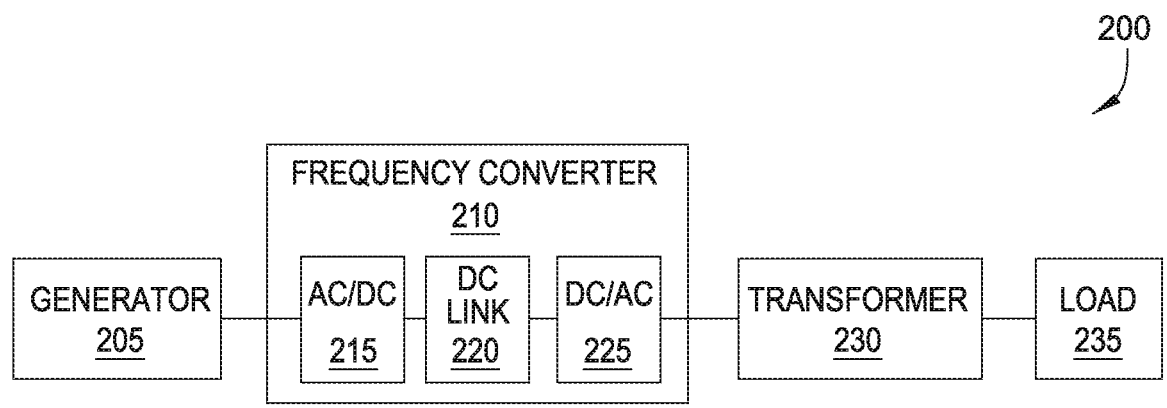
FIG. 2 illustrates a power generation system with a frequency converter, according to one embodiment described herein.

FIG. 2 illustrates a power generation system 200, according to one embodiment described herein. The system 200 includes a generator 205, frequency converter 210, transformer 230, and load 235. Generally, generator 205 converts a mechanical force (e.g., wind, steam, etc.) into electrical power. In one embodiment, the generator 205 may be a variable speed generator, and as such, the electrical power signal produced by the generator 205 may have a varying frequency. For example, the AC power signal may range from 50 Hz to 150 Hz. Because the load 235 may demand a power signal at a predefined frequency (e.g., 50 Hz or 60 Hz), the frequency converter 210 (also referred to as a power converter) converts the output of the generator 210 to an AC power signal at the desired frequency. To do so, the converter 210 includes an AC/DC converter 215 that changes the AC power signal from the generator 205 into a DC signal, a DC link or bus 220 that transfers the DC signal, and a DC/AC converter 225 that converts the DC signal back into a AC signal that has the frequency desired by the load 235. The AC signal is then sent to a transformer 230 which adjusts the current and voltage before transmitting the AC signal to the load 235—e.g., a utility grid forming a consumer power network.

In one embodiment, generator 205 outputs a power signal having one or more phases. A three-phase signal may be typical, but this disclosure may be used in a system using any number of phases. The frequency converter 210 may include one or more converter "paths" for converting the power signal to the desired frequency. For instance, if the generator 205 outputs a three-phase signal, the converter 210 may include a plurality of parallel converter paths that each includes a respective AC/DC converter 210, DC link 220, and DC/AC converter 225. For example, the converter 210 may include three or four parallel converter paths for converting the three-phase signal into the desired frequency. As such, each of the parallel converter paths may be referred to as a "parallel converter." For example, frequency converter 210 may include three parallel converters.

Figure 3A:
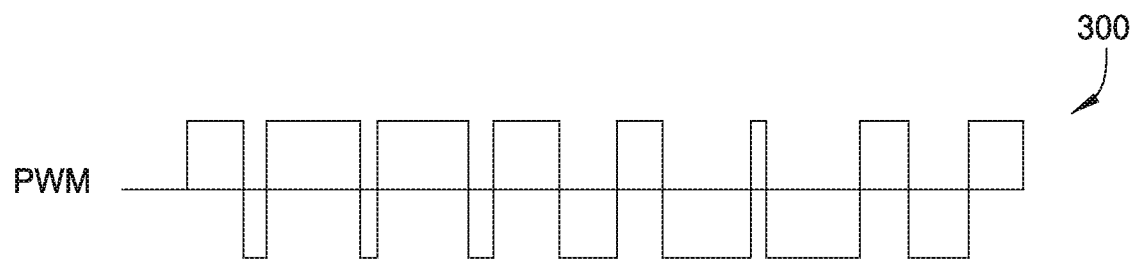
FIGS. 3A and 3B illustrate signals corresponding to PWM, according to one embodiment described herein.
Figure 3B:
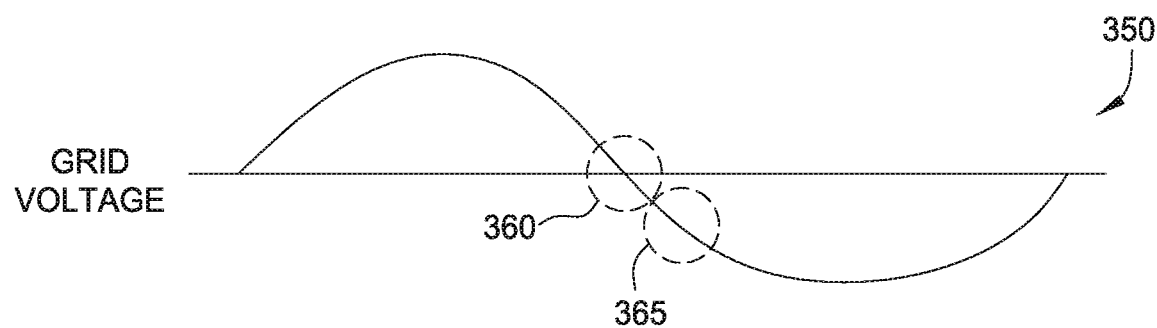

FIGS. 3A and 3B illustrate signals corresponding to PWM, according to one embodiment described herein. Specifically, chart 300 in FIG. 3A illustrates using PWM to generate an AC signal from a DC signal. To do so, the PWM signal shown in chart 300 (e.g., a 3-4 kHz signal) may be used as a control signal for the DC/AC converter 225 shown in FIG. 2. By controlling power switches in the converter 225 using the PWM signal, the output voltage of the converter 225 is driven either up or down. More specifically, changing the duty cycle of the PWM signal determines whether the output voltage of the converter 225 increases or decreases. FIG. 3B illustrates the output voltage of converter 225 based on applying the PWM signal in FIG. 3A to the DC/AC converter 225. Chart 350 illustrates a resulting AC sine wave (after using a low pass filter to smooth the signal) that then may be provided to the load or grid. As can be seen by comparing the duty cycle shown in chart 300 to the change in voltage shown in chart 350, increasing the duty cycle of the PWM signal increases the output voltage of the DC/AC converter 225, while decreasing the duty cycle decreases the output voltage. In this manner, the duty cycle of a high-frequency signal can be used to generate a low-frequency AC signal.

Figure 4:
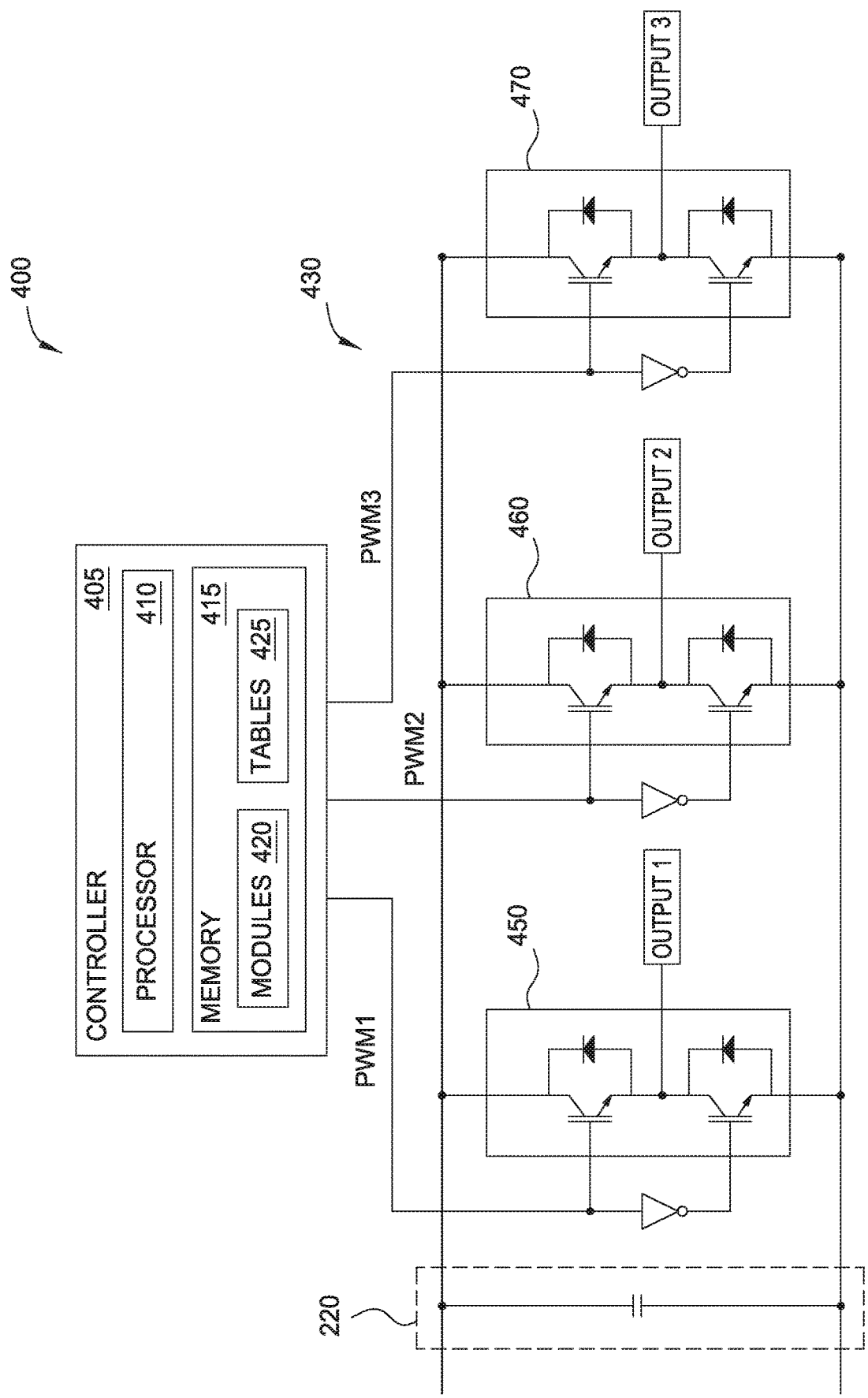
FIG. 4 illustrates a power converter for noise-shaped random PWM, according to one embodiment described herein.

FIG. 4 illustrates a power converter for noise-shaped random PWM, according to one embodiment described herein. Specifically, system 400 includes a controller 405 and a DC/AC converter 430. The DC/AC converter 430 may represent a portion of DC/AC converter 225 (e.g., one of multiple parallel converter paths), or may be one implementation of DC/AC converter 225.

The controller 405 includes a processor 410 and a memory 415. The processor 410 may include any processing element suitable for performing functions described herein, and may include single or multiple core processors, as well as combinations thereof. Memory 415 may include a variety of computer readable media selected for their size, relative performance, or other capabilities: volatile and/or non-volatile media, removable and/or non-removable media, etc. Memory 415 may include cache, random access memory (RAM), storage, etc. Storage included as part of memory 415 may typically provide a non-volatile memory for the controller 405, and may include one or more different storage elements such as Flash memory, a hard disk drive, a solid state drive, an optical storage device, and/or a magnetic storage device.

Memory 415 may include a plurality of modules 420 for performing various functions described herein. The modules 420 generally include program code that is executable by processor 410. Some examples of modules 420 may include random number generation, filtering, and timing signal generation. Memory 420 may also include one or more look-up tables 425 that may be accessed and/or modified by various modules 420. The look-up tables 425 may store a distribution of timing values, which may or may not be adapted before being used to generate the PWM timing signals.

As shown, DC/AC converter 430 is coupled to DC link 220, which may also be coupled to an AC/DC converter 215 (not shown). The DC/AC converter 430 includes three DC/AC converters 450, 460, 470, each of which may be driven to produce a respective phase of the output signal. Controller 405 may generate PWM timing signals PWM1

(corresponding to converter 450), PWM2 (corresponding to converter 460), and PWM3 (corresponding to converter 470) using processor 410 and memory 415.

Each of the DC/AC converters 450, 460, 470 each include two switches (e.g., power transistors) where the gate of the upper switch is coupled to the positive voltage rail $V_{DD}/2$ (i.e., the positive voltage of DC link 220) and is controlled by PWM1, and the gate of the lower switch is coupled to the negative voltage rail $-V_{DD}/2$ (i.e., the negative voltage of the DC link) and is controlled by the inverse of PWM1 (or PWM1*). For example, when PWM1 is high, the upper switch of DC/AC converter 450 is open and the lower switch is closed. The output voltage of DC/AC converter 450 (OUTPUT 1) is driven up to $V_{DD}/2$. However, when PWM1 is low (and PWM1* is high), the lower switch is open and upper switch is closed. Accordingly, OUTPUT 1 is driven down to $-V_{DD}/2$.

While the foregoing discussion has centered on generating PWM signals for DC/AC converters, persons of ordinary skill will recognize that the same principles and techniques may also be applied to switches of AC/DC converters to control power at the DC link and/or output power. In some embodiments, the controller 405 may control AC/DC converters alternatively to, or in addition to, the DC/AC converters discussed above.

Figure 5A:
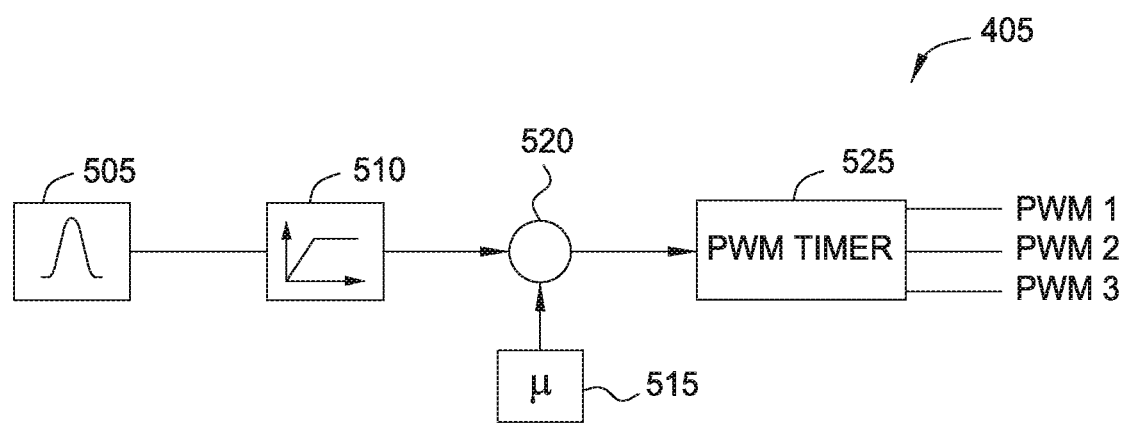
FIGS. 5A-5C illustrate controller arrangements for performing noise-shaped random PWM, according to embodiments described herein.
Figure 5B:
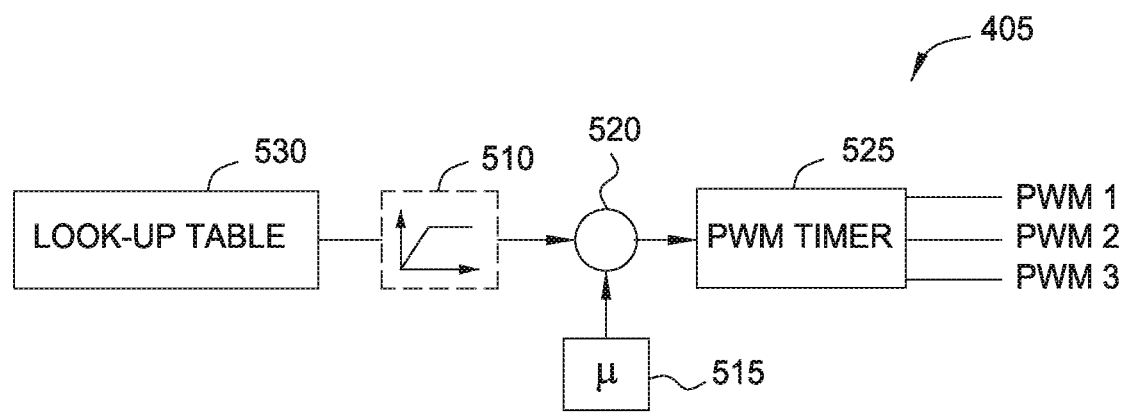
Figure 5C:
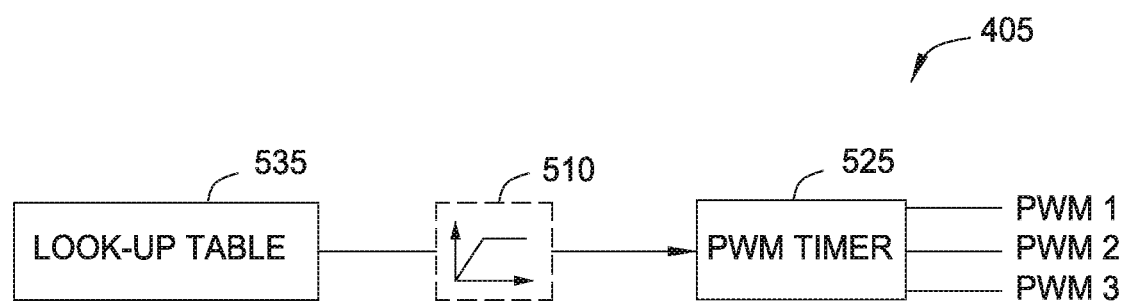

FIGS. 5A-5C illustrate controller arrangements for performing noise-shaped random PWM, according to embodiments described herein. FIG. 5A illustrates a configuration of controller 405, according to one embodiment. Distribution generation module 505 produces a desired base distribution of timing values. In one embodiment, the base distribution may be a substantially random number distribution. The random number distribution may be generated according to any known algorithms and known distributions (e.g., Gaussian). Of course, the person of ordinary skill will recognize that processor-based random number generation in some cases may be pseudo-random and not truly random. However, even pseudo-random number generation may provide a substantially random distribution that is suitable for performing the principles and techniques described herein. In one embodiment, the power spectral density of the base distribution may correspond to "white" noise, which provides a substantially constant power density across the frequency spectrum. Other embodiments may use alternative distributions of timing values. The alternative distributions may include non-Gaussian white noise (e.g., using Poisson or Cauchy distributions, etc.), or distributions that correspond to other power spectral densities (such as "pink," "red," "grey," or any other desired power spectral density distribution).

The distribution generation module 505 may generate a distribution of timing values for the PWM timer directly, or the values produced by the distribution generation module 505 may be modified to correspond to desired switching frequency ranges. For example, if the desired distribution of PWM timing signals is between 3.5 kilohertz (kHz) and 4.5 kHz, the distribution generation module 505 may generate timing values corresponding to this frequency range. In some embodiments, the distribution generation module 505 may generate a distribution of offset values within a predetermined range, and the offset values are added to a mean timer value before being applied to the PWM timer. For example, distribution generation module 505 may generate a random distribution of timing values with a range corresponding to ±500 hertz (Hz). These timing values are then added to a mean timer value (e.g., corresponding to a center frequency of 4 kHz) to produce the desired distribution of PWM timing signals (from 3.5 kHz to 4.5 kHz).

As shown, the output of distribution generation module 505 is input into a filtering module 510 which includes a filtering arrangement of one or more filters. In one embodiment, filtering module 510 may include a high-pass filter. However, other known types of filters may be used (such as low-pass, bandpass, bandstop, etc.) based on desired effects on tonal noise. Likewise, the properties of the filtering module 510 (such as cutoff frequencies) may be selected based on the desired effects on tonal noise. For example, a cutoff frequency for a high-pass filter may be selected to correspond to audible noise less than about 100 Hz. In one embodiment, the properties of the filtering module 510 may be selected based on susceptibility of the controller to EMI. For example, operation of the controller may be affected by EMI occurring at frequencies of about 10 Hz or less. The altered operation of the controller may cause undesired current or torque signals in the generator, which in turn affects the quality of the output power signal and may also have deleterious effects on generator components. Thus, the type and/or properties of the filtering module 510 may be set to filter frequencies corresponding to the susceptible frequencies.

The output of filtering module 510 (i.e., a filtered distribution of timing values) may be combined with a mean timer value module 515 using an adder 520. As in the example above, the distribution generation module 505 may produce values corresponding to ±500 Hz, and the mean timer value may be approximately 4 kHz. Thus, adder 520 outputs timing values corresponding with a range between 3.5 kHz and 4.5 kHz. The PWM timer 525 receives the timing values provided by adder 520 and generates the appropriate PWM timing signals (e.g., PWM1, PWM2, PWM3) for controlling a plurality of converters.

In an alternative embodiment, the distribution of timing values generated by the distribution generation module 505 may be added with the mean timer value, and the result is then filtered using filtering module 510.

FIG. 5B illustrates another configuration of controller 405, according to one embodiment. A look-up table 530 may include one or more distributions of timing values, e.g., Gaussian white noise. As shown, look-up table 530 may provide timing offset values that may be summed with a mean timer value (e.g., using adder 520 and mean timer module 515) to produce the desired timing values for the PWM timer 525. The distribution of timing values from look-up table 530 may optionally be filtered using filtering module 510 before adding to the mean timer value. In one embodiment, the distribution in the look-up table 530 may be "pre-filtered," that is, having a power spectral density that is modified at certain frequencies or ranges of frequencies. In such a case, filtering of the distribution at those modified frequencies may not be needed. The PWM timer 525 receives the timing values provided by adder 520 and generates the appropriate PWM timing signals (e.g., PWM1, PWM2, PWM3) for controlling a plurality of converters.

In an alternative embodiment, adding the distribution of timing values from look-up table 530 with the mean timer value may occur before filtering the result using the filter module 510.

Using look-up table 530 to provide the distribution of timing values may generally require less time and energy than generating random distributions and performing other processing functions on-the-fly. In one embodiment, a distribution may be generated by distribution generation module 505 and stored in the look-up table 530. Alternatively, the distribution may be filtered using filter module 510 prior to storing the filtered distribution in the look-up table 530. Subsequently, a distribution stored in the look-up table 530 may be accessed to provide the desired distribution of timing values, instead of using the processor to generate (and filter) another distribution.

FIG. 5C illustrates another configuration of controller 405, according to one embodiment. Look-up table 535 may include one or more distributions of timing values, e.g., Gaussian white noise. As shown, look-up table 535 may provide desired timing values for the PWM timer 525 without requiring the step of adding a mean timer value. The distribution of timing values from look-up table 535 may optionally be filtered using filtering module 510 before being provided to the PWM timer 525. In one embodiment, the distribution included in the look-up table 535 may be "pre-filtered," that is, having a power spectral density that is modified at certain frequencies or ranges of frequencies. In such a case, filtering of the distribution at those modified frequencies may not be needed. The PWM timer 525 receives the timing values provided by look-up table 535 (and optionally filtered) and generates the appropriate PWM timing signals (e.g., PWM1, PWM2, PWM3) for controlling a plurality of converters.

Figure 6:
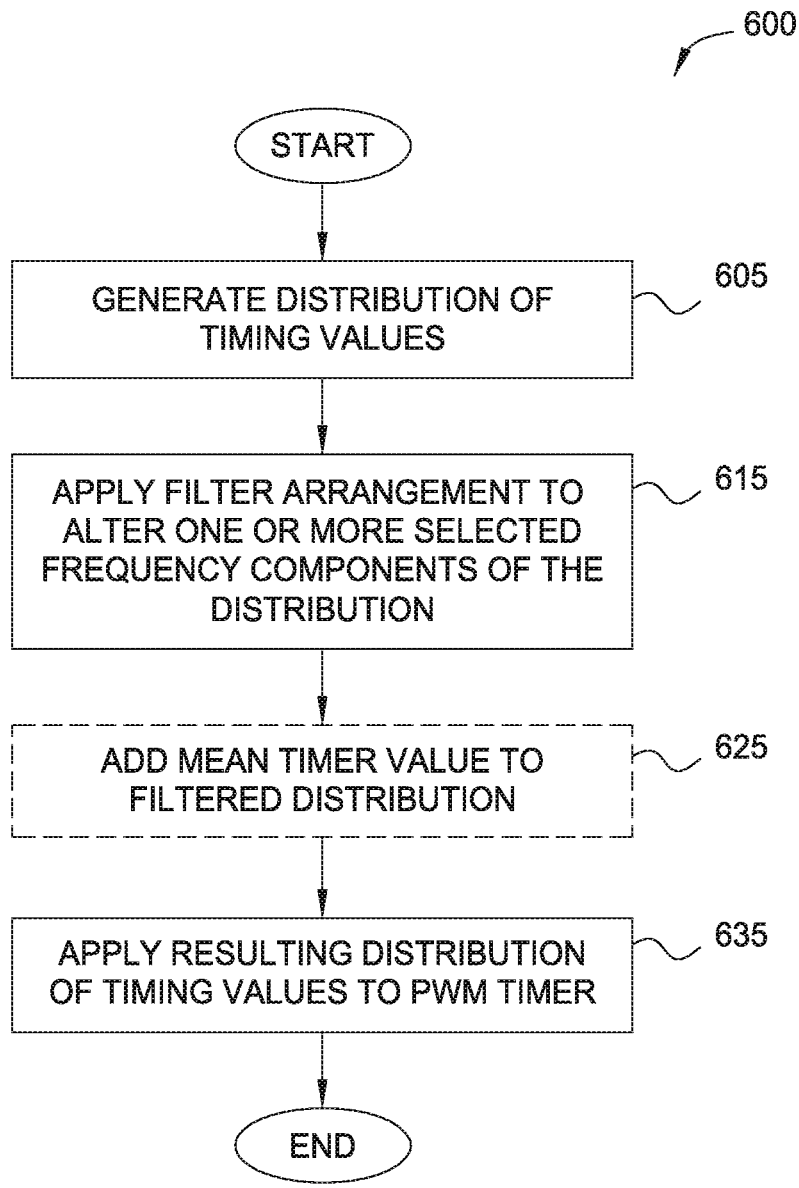
FIG. 6 illustrates a method of performing noise-shaped random PWM, according to embodiments described herein.

FIG. 6 illustrates a method of performing noise-shaped random PWM, according to embodiments described herein. In some embodiments, method 600 may be used to control one or more power converters (e.g., the AC/DC converter 210, DC/AC converter 225, or DC/AC converter 430 described above). Method 600 begins at block 605, in which a distribution of timing values is generated. In some embodiments, the distribution may be substantially random, and may correspond to a constant power spectral density (e.g., Gaussian white noise). However, other embodiments may include alternative distributions of timing values. In some embodiments, the distribution of timing values may correspond directly to the desired range of PWM switching frequencies for the converter. In other embodiments, the distribution of timing values may be timing offset values that may be added to a mean timer value to produce the desired range of switching frequencies. In one example, a controller may generate a distribution of timing values corresponding to switching frequencies between 3.5 kHz and 4.5 kHz. In another example, a controller may generate a distribution of timing values corresponding to ±500 Hz, which may be added to a mean timing value (e.g., 4 kHz) to produce the desired distribution of timing values. In some embodiments, the generated distribution may be accessed using a look-up table.

At block 615, a filter arrangement is applied to alter one or more selected frequency components of the generated distribution. In one embodiment, the filter arrangement may include a high-pass filter having properties selected to provide desired effects on tonal noise. For example, a cutoff frequency may be selected based on audible noise, or based on the controller's EMI susceptibility. Alternative embodiments may include other types of filters (e.g., low-pass, bandpass, bandstop) depending on desired effects on tonal noise.

Block 625 is optionally performed for embodiments in which the generated distribution of timing values are timing offset values. At block 625, a mean timer value is added to the generated, filtered distribution to produce a distribution that corresponds to the desired range of PWM switching frequencies. In an alternative embodiment, the filter arrangement may be applied (block 615) after the mean timer value is added to the generated, filtered distribution (block 625).

At block 635, the resulting distribution of timing values is applied to a PWM timer. In turn, the PWM timer generates the appropriate PWM timing signals (e.g., PWM1, PWM2, PWM3) that may be used to control a plurality of power converters.

While various embodiments discuss the application of noise-shaped random PWM to power converters that are connected with a generator in order to control noise emanating from the generator, similar techniques may also be applied at other stages of power generation and delivery with similar beneficial effect. For example, a power converter connected to the utility grid may use noise-shaped random PWM in order to decrease the emission of harmonics toward the utility grid while reducing any impact to the performance of the associated controller.

Figure 7:
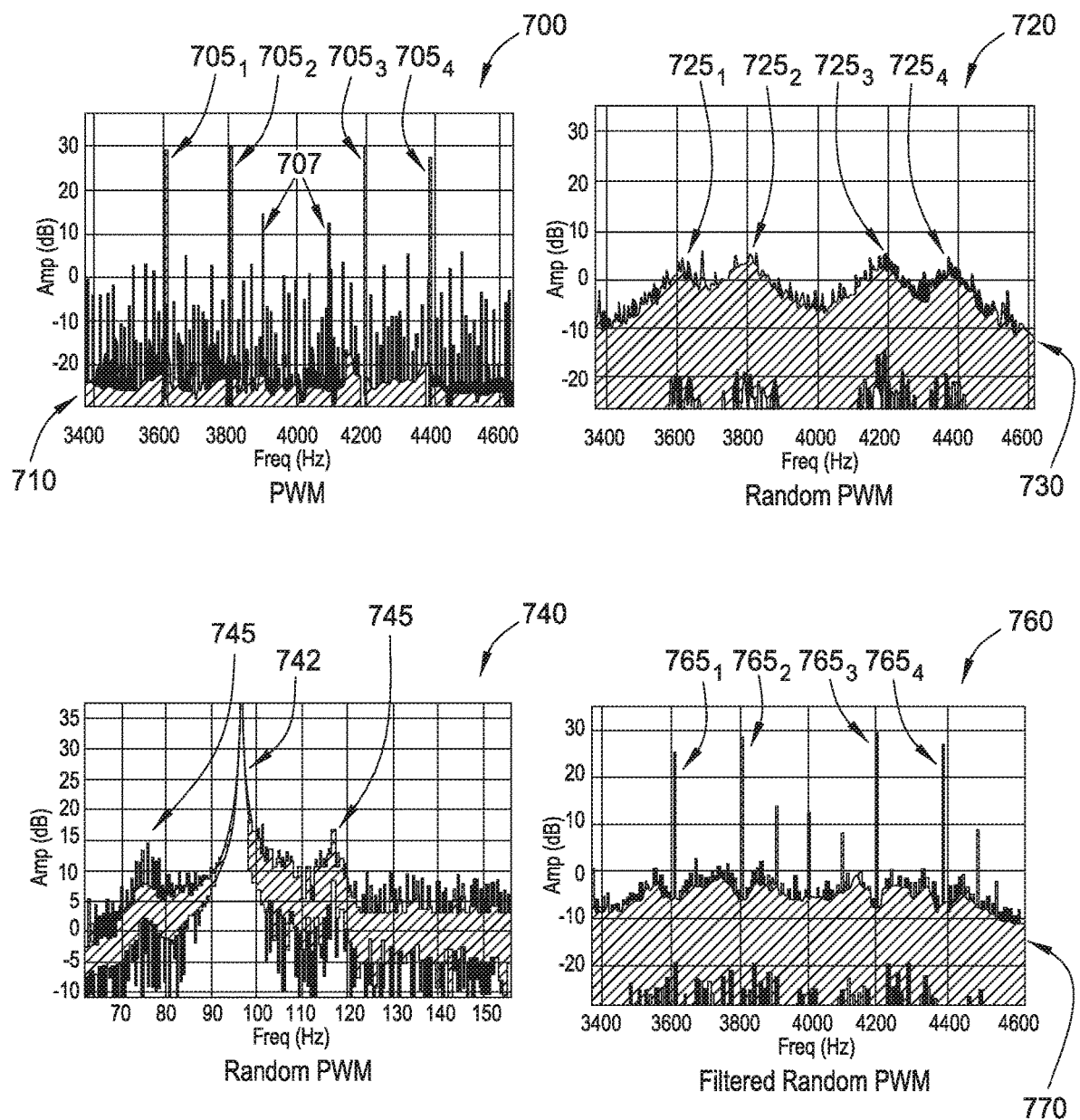
FIG. 7 illustrates plots of power spectral density for different PWM regimes, according to embodiments described herein.

FIG. 7 illustrates plots of power spectral density for different PWM regimes, according to one embodiment. Plot 700 illustrates conventional PWM operating at a 4 kHz switching frequency. Several spectral peaks $705_1$-$705_4$ are located at harmonic frequencies (e.g., 4 kHz±(n*200 Hz); n=1, 2, . . . ). The differences between the amplitudes of the spectral peaks $705_1$-$705_4$ and the amplitude of the noise floor 710 may be large enough to cause the wind turbine to exceed imposed sound power level limits. Additionally, amplitudes of other frequency components 707 may also exceed imposed limits.

Plot 720 illustrates conventional random PWM at the same 4 kHz switching frequency. Note that the spectral peaks $725_1$-$725_4$ have much smaller amplitudes than corresponding spectral peaks $705_1$-$705_4$, and that spectral peaks $725_1$-$725_4$ are also much closer to the raised noise floor 730. The smaller amplitude differences indicate that the wind turbine (or other power generating system using the random PWM) is more likely to remain within imposed sound power level limits. However, conventional random PWM operates by adding noise at all frequencies within the spectrum, which may cause negative effects on operation of the wind turbine (e.g., low-frequency EMI affecting operation of the controller). Plot 740 illustrates a fundamental frequency 742 and sidebands 745 in conventional random PWM. The distortion caused by the sidebands 745 is not present in embodiments that include filtered random PWM.

Plot 760 illustrates filtered random PWM, according to one embodiment. Generally, plot 760 reflects a random distribution of timing values that has been high-pass filtered to remove certain low-frequency components (e.g., EMI affecting the controller). While several spectral peaks $765_1$-$765_4$ are included at harmonic frequencies having amplitude relatively larger than those in conventional random PWM, the difference in amplitude with the noise floor 770 is still small enough to remain within imposed power level limits. Additionally, effects of the PWM timing signals at certain frequencies, which may negatively impact operation of the controller, have been mitigated.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In view of the foregoing, the scope of the present disclosure is determined by the claims that follow.

What is claimed is:

1. A power generation system comprising:
   a generator configured to provide a generator output power having one or more phases;
   a power converter system coupled with the generator and configured to provide a converter output power using the one or more phases of the generator output power; and
   a controller arrangement coupled with one or more converters of the power converter system, wherein the controller arrangement is configured to:
      determine an audible noise limit that is imposed on the power generation system;
      determine a substantially random distribution of timing values to comply with the audible noise limit;
      filter, based on an electromagnetic interference (EMI) susceptibility of the controller arrangement, the substantially random distribution of timing values to produce a modified random distribution; and
      deliver pulse width modulation (PWM) timing signals based on the modified random distribution to the one or more converters.

2. The power generation system of claim 1, wherein the controller arrangement includes a high-pass filter for filtering the substantially random distribution of timing values.

3. The power generation system of claim 2, wherein a frequency threshold for the high-pass filter is determined based on the EMI susceptibility of the controller arrangement.

4. The power generation system of claim 3, wherein the frequency threshold is between about 0 hertz (Hz) and about 100 Hz.

5. The power generation system of claim 1, wherein the controller arrangement includes a look-up table that includes the substantially random distribution of timing values.

6. The power generation system of claim 1, wherein the controller arrangement includes a random number generation module that is used to produce the substantially random distribution of timing values.

7. The power generation system of claim 1, wherein the controller arrangement is further configured to add a mean value to the modified random distribution, and wherein the PWM timing signals are also based on the added mean value.

8. The power generation system of claim 1, wherein the one or more converters of the power converter system include one or more DC/AC converters.

9. The power generation system of claim 1, wherein the one or more converters of the power converter system include one or more AC/DC converters.

10. A wind turbine comprising:
    a generator configured to provide a generator output power having one or more phases;
    a power converter system coupled with the generator and configured to provide a converter output power using the one or more phases of the generator output power; and
    a controller arrangement coupled with one or more converters of the power converter system, wherein the controller arrangement is configured to:
       filter a substantially random distribution of timing values to produce a modified random distribution, wherein the substantially random distribution is selected to comply with an audible noise limit for the wind turbine, and wherein filtering the substantially random distribution of timing values is based on an electromagnetic interference (EMI) susceptibility of the controller arrangement; and
       deliver pulse width modulation (PWM) timing signals based on the modified random distribution to the one or more converters.

11. The wind turbine of claim 10, wherein the one or more converters of the power converter system include one or more DC/AC converters.

12. The wind turbine of claim 10, wherein the one or more converters of the power converter system include one or more AC/DC converters.

13. A method of operating one or more power converters of a wind turbine, the method comprising:
    generating a substantially random distribution of timing values to comply with an audible noise limit imposed on the wind turbine;
    applying a filter to the substantially random distribution to produce a modified random distribution, wherein the applying the filter mitigates an electromagnetic interference (EMI) susceptibility of a controller of the wind turbine; and
    delivering pulse width modulation (PWM) timing signals based on the modified random distribution to the one or more power converters.

14. The method of claim 13, further comprising:
    storing the substantially random distribution in a look-up table; and
    accessing the substantially random distribution in the look-up table before applying the filter to the substantially random distribution.

15. The method of claim 13, wherein the filter applied to the substantially random distribution includes a high-pass filter.

16. The method of claim 15, further comprising determining a frequency threshold for the high-pass filter based on the EMI susceptibility of the controller.

17. The method of claim 16, wherein the frequency threshold is between 0 and about 100 hertz (Hz).

18. The method of claim 13, further comprising adding a mean value to the modified random distribution, wherein the PWM timing signals are also based on the added mean value.

19. The method of claim 13, wherein the PWM timing signals are delivered to one or more DC/AC converters of the one or more power converters.

20. The method of claim 13, wherein the PWM timing signals are delivered to one or more AC/DC converters of the one or more power converters.

* * * * *